Patented May 8, 1923.

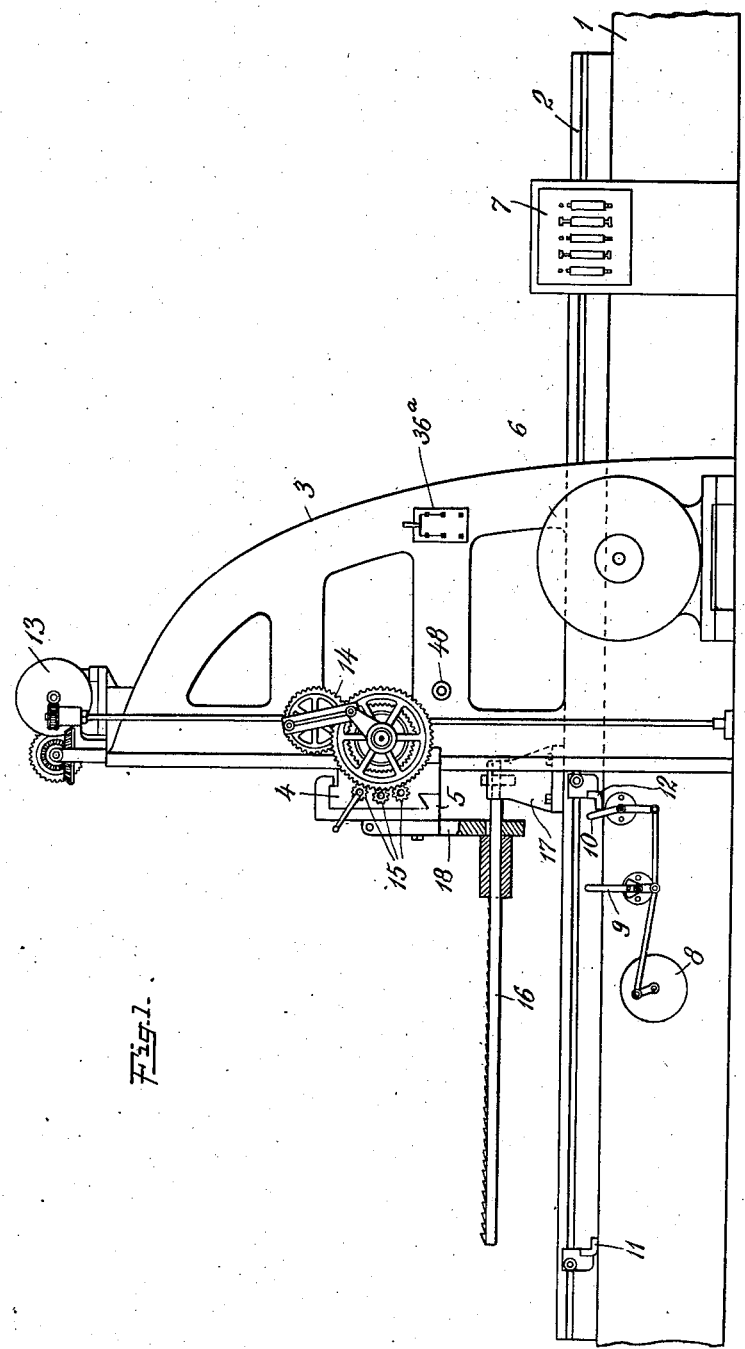

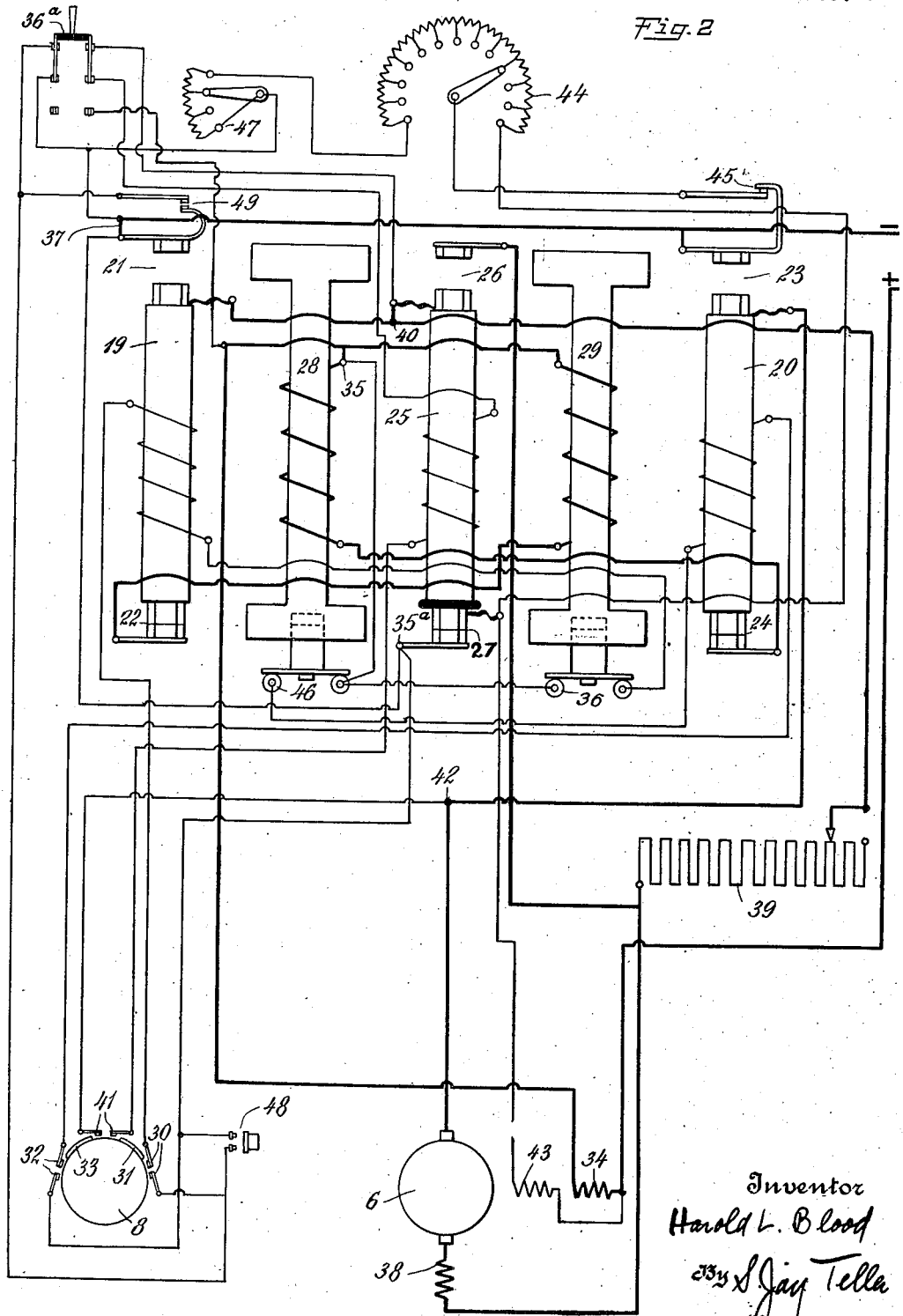

1,454,102

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

BROACHING MECHANISM.

Application filed July 11, 1919. Serial No. 310,062.

*To all whom it may concern:*

Be it known that I, HAROLD L. BLOOD, a citizen of the United States, residing at Plainfield, in the county of Union and State of New Jersey, have invented certain new and useful Improvements in Broaching Mechanisms, of which the following is a specification.

One of the objects of the invention is to provide a broaching mechanism having an electric motor which operates in one direction to effect broaching and in the other direction to effect a return movement. A further object of the invention is to provide improved means for controlling the operation of the electric motor. A still further object of the invention is to provide a mechanism which can be used as an attachment for a metal planing machine to enable broaching to be effected thereon. Additional objects of the invention will be apparent from the following specification and claims.

In the accompanying drawings I have illustrated an embodiment of the invention which consists of an attachment applied to a metal planing machine of standard construction. As concerns certain of its features, however, the invention is not limited to an attachment and it may be embodied in a special machine intended primarily for broaching. The drawings, therefore, are not to be construed as defining or limiting the scope of the invention, the accompanying claims being relied upon for that purpose.

Of the drawings:

Fig. 1 is a side view of a metal planing machine provided with an attachment constructed in accordance with the invention.

Fig. 2 is a diagram of electrical connections.

Referring to the drawings, Fig. 1 shows a metal planer having a bed 1, a reciprocating table 2, a housing 3, a cross rail 4 vertically adjustable on the housing 3, and one or more tool heads 5 transversely adjustable along the rail 4. The table 2 may be driven in any desired way, but preferably, and in accordance with certain features of the invention, the table is driven by an electric motor 6 which is positively geared to the table and which reverses from time to time to effect the table reciprocations. The motor is under the control of a controller 7 which is operated by a pilot switch 8. As shown, the pilot switch is of the drum type and is operated by levers 9 and 10 which are engaged respectively by dogs 11 and 12 on the reciprocating table 2. In order that the machine may be used for ordinary planing operations, a suitable machanism is provided for feeding the tool heads 5 transversely along the rail 4. As illustrated, this mechanism comprises an electric motor 13 which is connected with the tool heads by means of suitable gear mechanism 14 and suitable feed shafts 15 extending longitudinally of the rail 4.

In accordance with my invention, the reciprocating table 2 is utilized to effect the desired relative movement between the broaching tool and the work, one of these being held by the tool holder and the other by the table. As illustrated, a broaching tool 16 is carried by a bracket 17 secured to the table 2, being thus longitudinally movable. The tool is readily detachable from the bracket, use being made of any of the connecting devices which are well known to those familiar with broaching practice. As shown there is a removable key for holding the tool in place in the bracket. Carried by the tool head 5 is a bracket 18 which has an aperture therein for the reception of the broaching tool 16. As illustrated, the bracket 18 serves as a guide for the broaching tool and also as an abutment for holding the work. It will be understood that the shape of the bracket may be varied or that supplemental work holders may be secured thereto, as required for work of different kinds.

In operation, a piece of work to be broached is put in place, as shown in Fig. 1, and the broaching tool is inserted through the aperture in the work and is secured to the bracket 17. The table is started toward the right, as viewed in Fig. 1, and the broaching tool is drawn through the work, broaching being effected in the usual way to enlarge the hole therein and form it with the proper size and shape. At the end of the broaching movement the table is reversed and the broaching tool is moved back to the initial position, as shown in Fig. 1. The table movement is then stopped and the finished work is removed and a new piece of work is put in place, as before described.

While I have thus far described my invention as consisting of an attachment for a planing machine of standard construction, I desire it to be understood that, as concerns the features now to be described, I do not limit myself to a planing machine, and may embody the invention in a machine designed especially for broaching.

In the preferred embodiment of the invention relative movement between the work and the broaching tool is effected by means of an electric motor which is reversed for the purpose of reversing the relative movement. When a planing machine is used, as illustrated, the motor is the main planer driving motor 6. This motor is operated in one direction to move the table 2 and the tool 16 toward the right for the broaching movement and toward the left for the return movement. The broaching movement is started manually and the reversal at the end of the broaching movement is effected automatically. At the end of the return movement the motor stops and remains inoperative until again started manually for another broaching movement.

The mechanical and electrical construction whereby the control of the motor is effected will now be described. It will be assumed that the machine is to be used also for planing. Referring to the diagram of electrical connections, 19 and 20 are operating solenoids for switches 21 and 22 and 23 and 24 respectively. Between the solenoids 19 and 20 is a third operating solenoid 25 for switches 26 and 17. Between the solenoids 19 and 25 is a blow-out magnet 28 and between the solenoids 25 and 20 is a blow-out magnet 29.

The pilot switch 8 is provided with fixed contacts 30 adapted to be connected by a movable contact 31, and with fixed contacts 32 adapted to be connected by a movable contact 33. When the motor is to be started in the direction for cutting, the pilot switch 8 is placed in its right-hand position with the contacts 30 connected by the contact 31. The operating circuit for the solenoid 19 then extends from the positive main through the series field 34 to a point 35, and thence through a switch 36 to the coil of the solenoid 19. From the coil the circuit extends through the contacts 30 and 31 of the switch 8 to the left-hand pole of a double-pole double-throw switch 36ª which is in its upper position. From the switch 36ª the circuit extends to the negative line at 37.

When the switch 21 is closed the main motor circuit extends from the positive main through the series field 34 to the point 35 and the coil of the blow-out magnet 28. From this coil the circuit extends through the switch 24 and the core of the solenoid 20 to the motor armature. From the armature the circuit extends through an interpole winding 38 and an armature resistance 39 to the switch 21 and thence to the negative main at 37. When this motor circuit is closed the main motor starts in the direction for the cutting stroke of the planer.

The solenoid 25 acts to short-circuit the resistance 39. Assuming the solenoid 19 to be energized, as described, the operating circuit for the solenoid 25 extends from one side of the motor circuit at 40 through the right-hand pole of the switch 36ª to the coil of the solenoid. From the coil the circuit extends to fixed contacts 41 on the switch 8 which are adapted to be connected by one or the other of the movable contacts 31 and 33. From the contacts 41 the circuit extends to the other side of the motor circuit at 42. When the counter electro-motive force becomes sufficient, the core of the solenoid 25 is lifted and the switch 26 is closed, thus short-circuiting the starting resistance 39, the motor circuit then extending directly from the interpole winding 38 through the switch 26 to the point 40.

The shunt field of the motor is indicated at 43, the circuit for this field initially including the switch 27. When the core of the solenoid 25 is lifted, as described, the switch 27 is opened and the circuit for the shunt field then extends to an adjustable cutting resistance 44 and thence to the negative main through a switch 45 which is normally closed. By adjusting the resistance 44 the cutting speed can be regulated as desired.

At the end of the cutting stroke the pilot switch is moved to disconnect the contacts 30, thus deenergizing the solenoid 19 and opening the switch 21 and closing the switch 22. A dynamic braking circuit is then established, this circuit extending from the armature of the motor through the core of the solenoid 20, the switch 24, the coil of the blow-out magnet 28, the coil of the blow-out magnet 29, the switch 22, the core of the solenoid 19, the resistance 39 and the interpole winding 38.

The movement of the pilot switch not only serves to disconnect the contacts 30 but also serves to connect the contacts 32. The operating circuit for the solenoid 20 is thus closed, this circuit extending from the positive main through the series field 34, the point 35 and the switch 46 to the coil of the solenoid. From the coil the circuit extends through the contacts 32 and 33 and the point 35ª back to the negative line at 37. The core of the solenoid 20 is lifted and the switch 23 is closed and the switch 24 is opened. A motor circuit is established similar to that before described, except that the current flows to the motor armature in the reverse direction, thus causing the motor to rotate in the direction for the return movement. The solenoid 25 operates as before described to cut out the resistance 39 and to connect resistance into the shunt field circuit. The solenoid 20 serves to open the switch 45, thus placing the shunt field of the motor in circuit not only with all of the resistance 44 but also with more or less of a return resistance 47. This causes the motor to have a greater speed for the return movement. The return speed can be regulated by adjusting the resistance 47. At the end of the return movement the motor is dynamically braked, as before described, and these cutting and return movements are repeated indefinitely as the switch 8 is automatically operated by means of the dogs 11 and 12.

It will be observed that the operating circuits for the solenoids 19 and 20 extend respectively through the switches 36 and 46. These switches are associated respectively with the magnets 29 and 28 and are held open so long as the magnets are energized. Therefore at the end of each stroke while dynamic braking is taking place the operating circuits for the solenoids are held open thus preventing the main motor circuit from being closed.

For broaching, the switch 36ª is moved from its upper position to its lower position. This interrupts the before described circuit for the solenoid 19 and makes it impossible for the motor to be started in the cutting or broaching direction by means of the pilot switch. There is provided, however, a manually operable switch 48 which is normally open. When this switch is closed the operating circuit for the solenoid 19 is closed, this circuit extending from the contacts 30 through the switch 48 and back to the negative main through the point 35ª. In order to avoid the necessity of keeping the switch 48 closed after the motor starts in the direction for broaching, there is provided a switch 49 which is automatically closed by the solenoid 19. As soon as the switch 49 is closed, a second circuit is established from the contacts 30 through this switch to the negative line, thus permitting the switch 48 to be opened without de-energizing the solenoid.

The moving of the switch 36ª from its upper to its lower position serves to render the accelerating solenoid 25 inoperative during the broaching movement. In this way the movement is made much slower, as is required for broaching. While the operating circuit for the solenoid 25 is interrupted during the broaching movement, it will be seen that this circuit is nevertheless closed during the return movement. For the return movement the circuit extends from the negative side of the line through the switch 23, the point 42 to the contacts 41 and thence to the coil. From the coil the circuit extends through the right-hand pole of the switch 36ª and thence back to the positive side of the line. On the return movement, therefore, the accelerating solenoid acts as before described, but on the cutting movement it is inoperative.

At the end of the return movement the solenoid 20 is de-energized and dynamic braking takes place, as already described. However, the operating circuit for the solenoid 19 is broken at the switch 36ª and the motor can not be started in the broaching direction notwithstanding the movement of the switch 8. The machine therefore comes to rest at the end of the return movement, thus enabling the operator to remove the finished work and put new work in place. As soon as the new work is in place the machine is started by means of the switch 48 and the machine operates as already described.

What I claim is:

1. In a mechanism for broaching, the combination of a work holder, a holder for a broaching tool, an electric motor connected with one of the said holders for moving it relatively to the other, a manually operable switch for starting the motor in the broaching direction, means for automatically reversing the motor at the end of the broaching stroke to reverse the direction of relative movement, and means for automatically stopping the motor at the end of the return stroke.

2. In a mechanism for broaching, the combination of a work holder, a holder for a broaching tool, an electric motor connected with one of the said holders for moving it relatively to the other, two electromagnetic relay switches respectively adapted to connect the motor for rotation in opposite directions, a manually operable switch for closing one relay switch to start the motor in the broaching direction, and an automatic switch for opening the first relay switch and closing the second to reverse the motor at the end of the broaching stroke, the said automatic switch also serving to subsequently open the second relay switch but not to close the first at the end of the return stroke.

3. In a mechanism for broaching, the combination of a work holder, a holder for a broaching tool, an electric motor connected with one of the said holders for moving it relatively to the other, two electromagnetic relay switches respectively adapted to connect the motor for rotation in opposite directions, a manually operable switch for closing one relay switch to start the motor in the broaching direction, an automatic switch for opening the first relay switch and closing the second to reverse the motor at the end of the broaching stroke, the said automatic switch also serving to subsequently open the second relay switch but not to close the first at the end of the return stroke, and means dependent on the relative movement for operating the automatic switch, the said means being adjustable to change the length of stroke.

4. In a machine of the type described, the combination of a reciprocable table adapted to carry work to be planed, a tool head adapted to carry a planing tool, means adapted for adjusting the tool head transversely of the direction of table reciprocation, a holder for work to be broached and a holder for a broaching tool adapted to be secured one to the tool head and the other to the work table, means adapted to automatically reverse the table at the ends of the cutting and return strokes, and optionally usable means for rendering the last said means ineffective to reverse the table at the end of the return stroke thus adapting the machine for broaching.

5. In a machine of the type described, the combination of a reciprocable table adapted to carry work to be planed, a tool head adapted to carry a planing tool, means adapted for feeding the tool head transversely of the direction of table reciprocation whereby planing may be effected, a holder for work to be broached and a holder for a broaching tool adapted to be secured one to the tool head and the other to the work table, means adapted to automatically reverse the table at the ends of the cutting and return strokes, optionally usable means for rendering the last said means ineffective to reverse the table at the end of the return stroke thus adapting the machine for broaching, and manually operable device for starting the table in the broaching direction.

6. In a machine of the type described, the combination of a reciprocable table adapted to carry work to be planed, a tool head adapted to carry a planing tool, means adapted for adjusting the tool head transversely of the direction of table reciprocation, a holder for work to be broached and a holder for a broaching tool adapted to be secured one to the tool head and the other to the work table, an electric motor connected with the table to drive it, means adapted to automatically reverse the motor to thereby reverse the table at the ends of the cutting and return strokes, and optionally usable means for rendering the said reversing means ineffective to reverse the motor at the end of the return stroke of the table thus adapting the machine for broaching.

7. In a machine of the type described, the combination of a reciprocable table adapted to carry work to be planed, a tool head adapted to carry a planing tool, means adapted for feeding the tool head transversely of the direction of table reciprocation whereby planing may be effected, a holder for work to be broached and a holder for a broaching tool adapted to be secured one to the tool head and the other to the work table, an electric motor connected with the table to drive it, means adapted to automatically reverse the motor to thereby reverse the table at the ends of the cutting and return strokes, optionally usable means for rendering the said reversing means ineffective to reverse the motor at the end of the return stroke of the table thus adapting the machine for broaching, and a manually operable switch for starting the motor to start the table in the broaching direction.

8. In a machine of the type described, the combination of a reciprocable table adapted to carry work to be planed, a tool head adapted to carry a planing tool, means adapted for feeding the tool head transversely of the direction of table reciprocation whereby planing may be effected, a holder for work to be broached and a holder for a broaching tool adapted to be secured one to the tool head and the other to the work table, an electric motor connected with the table to drive it, two electromagnetic relay switches respectively adapted to connect the motor for rotation in opposite directions, an automatic switch for opening and closing the said relay switches alternately to reverse the motor and thereby reverse the table at the ends of the cutting and return strokes, and an optionally usable switch adapted to prevent the automatic closing of the relay switch for starting the motor in one direction, thus adapting the machine for broaching.

9. In a machine of the type described, the combination of a reciprocable table adapted to carry work to be planed, a tool head adapted to carry a planing tool, means adapted for adjusting the tool head transversely of the direction of table reciprocation, a holder for work to be broached and a holder for a broaching tool adapted to be a holder for a broaching tool adapted to be secured one to the tool head and the other to the work table, an electric motor connected with the table to drive it, two electromagnetic relay switches respectively adapted to connect the motor for rotation in opposite directions, an automatic switch for opening and closing the said relay switches alternately to reverse the motor and thereby reverse the table at the ends of the cutting and return strokes, an optionally usable switch adapted to prevent the automatic closing of the relay switch for starting the motor in one direction, thus adapting the machine for broaching, and a manually operable switch for closing the last said relay switch.

10. In a machine of the type described, the combination of a reciprocable table adapted to carry work to be planed, a tool head adapted to carry a planing tool, means adapted for feeding the tool head transversely of the direction of table reciprocation whereby planing may be effected, a holder for work to be broached and a holder for a broaching tool adapted to be secured one to the tool head and the other to the work table, an electric motor connected with the table to drive it, means adapted to automatically reverse the motor to thereby reverse the table at the ends of the cutting and return strokes, automatic means adapted to accelerate the motor at the beginning of rotation in each direction, optionally usable means for rendering the said reversing means ineffective to reverse the motor at the end of one stroke of the table thus adapting the machine for broaching, and optionally usable means for rendering the accelerating means ineffective during the broaching stroke.

11. In a machine of the type described, the combination of a reciprocable table adapted to carry work to be planed, a tool head adapted to carry a planing tool, means adapted for adjusting the tool head transversely of the direction of table reciprocation, a holder for work to be broached and a holder for a broaching tool adapted to be secured one to the tool head and the other to the work table, an electric motor connected with the table to drive it, means adapted to automatically reverse the motor to thereby reverse the table at the ends of the cutting and return strokes, automatic means adapted to accelerate the motor at the beginning of rotation in each direction, optionally usable means for rendering the said reversing means ineffective to reverse the motor at the end of one stroke of the table thus adapting the machine for broaching, and optionally usable means for rendering the accelerating means ineffective during the broaching stroke, the said accelerating means remaining operative during the return stroke.

12. In a machine of the type described, the combination of a reciprocable table adapted to carry work to be planed, a tool head adapted to carry a planing tool, means adapted for feeding the tool head transversely of the direction of table reciprocation whereby planing may be effected, a holder for work to be broached and a holder for a broaching tool adapted to be secured one to the tool head and the other to the work table, an electric motor connected with the table to drive it, means adapted to automatically reverse the motor to thereby reverse the table at the ends of the cutting and return strokes, automatic means adapted to accelerate the motor at the beginning of rotation in each direction, and a single manually operable switch serving in one position to maintain the reversing means and the accelerating means operable for both strokes whereby planing may be effected and serving in another position to render the reversing means effective at the end of the return stroke and to render the accelerating means ineffective during the cutting stroke whereby broaching may be effected.

13. In a machine of the type described, the combination of a reciprocable table adapted to carry work to be planed, a tool head adapted to carry a planing tool, means adapted for adjusting the tool head transversely of the direction of table reciprocation, a holder for work to be broached and a holder for a broaching tool adapted to be secured one to the tool head and the other to the work table, an electric motor connected with the table to drive it, two electromagnetic relay switches respectively adapted to connect the motor for rotation in opposite directions, an automatic switch for opening and closing the said relay switches alternately to reverse the motor and thereby reverse the table at the ends of the cutting and return strokes, a starting resistance for the motor, an automatic switch for cutting the starting resistance out of the motor circuit after the motor starts in each direction, an optionally usable switch adapted to prevent the automatic closing of the relay switch for starting the motor in one direction, thus adapting the machine for broaching, and means for rendering the switch for the starting resistance inoperative during the broaching stroke.

In testimony whereof, I hereto affix my signature.

HAROLD L. BLOOD.